Figure 1:
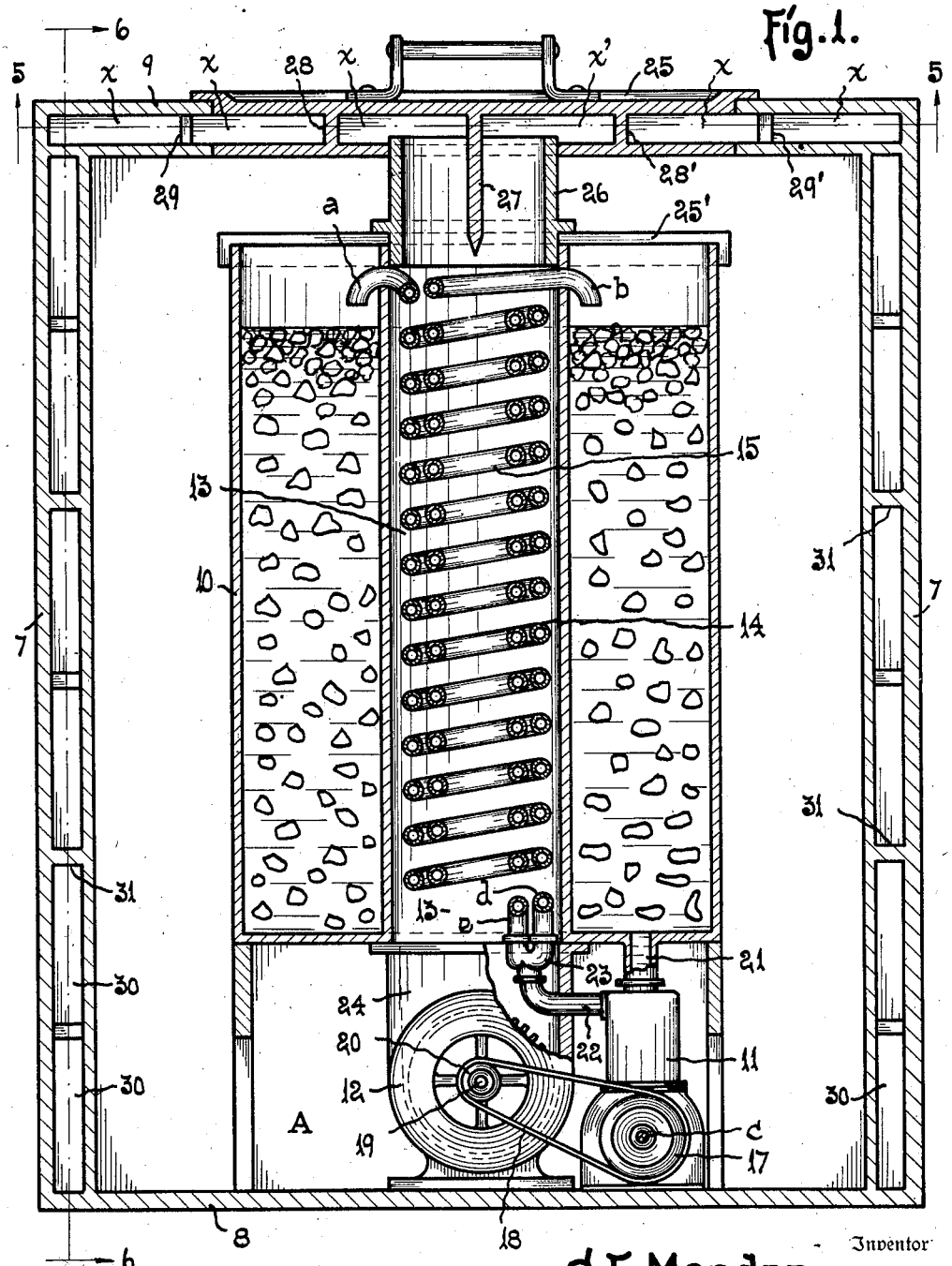

May 28, 1940.   C. F. MANDERY   2,202,635
AIR CONDITIONED VEHICLE
Filed June 26, 1939   2 Sheets-Sheet 1

Inventor
C.F. Mandery,
By
Hiram R. Sturges   Attorney

May 28, 1940. C. F. MANDERY 2,202,635
AIR CONDITIONED VEHICLE
Filed June 26, 1939 2 Sheets-Sheet 2
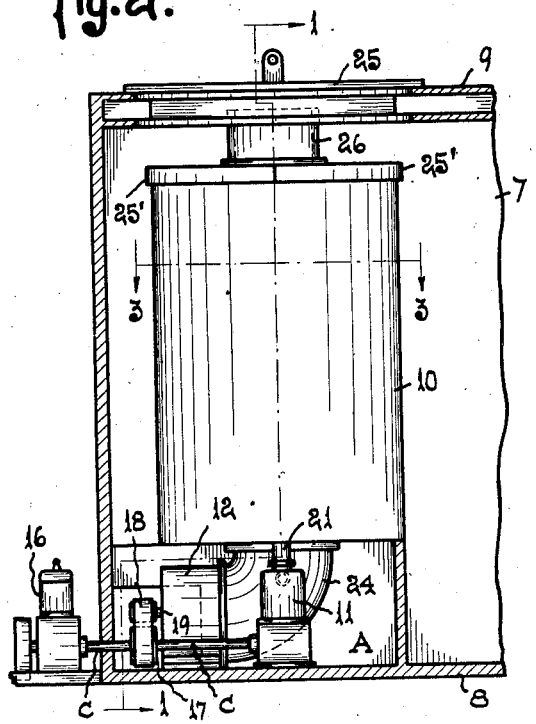
Fig.2.
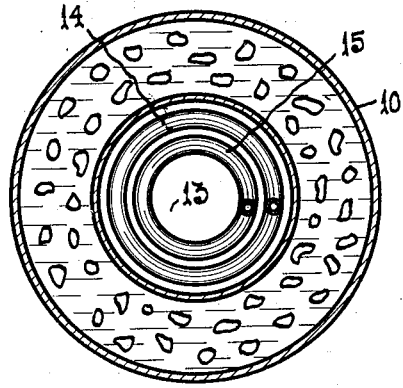
Fig.3.
Fig.4.
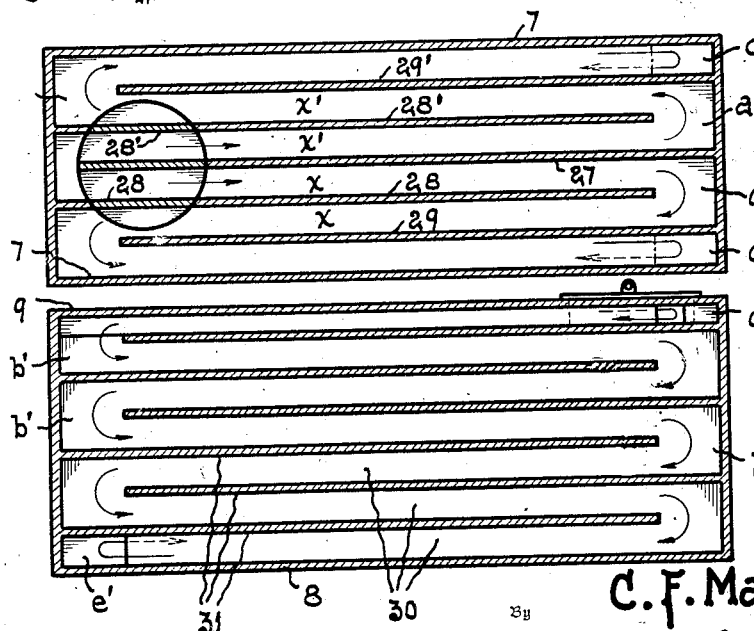
Fig.5.
Fig.6.
Inventor
C. F. Mandery,
By Hiram A. Sturges Attorney Patented May 28, 1940

2,202,635

UNITED STATES PATENT OFFICE 2,202,635

AIR CONDITIONED VEHICLE

Charles F. Mandery, Omaha, Nebr.

Application June 26, 1939, Serial No. 281,160

5 Claims. (Cl. 62—24)

This invention relates to transportation, and specifically refers to an air-conditioned trailer used for transporting perishable products, such as fresh meats or fish requiring a constant low temperature of 30 degrees F. or less.

The principal object in view is to provide a refrigerating agent which may be installed, to occupy a limited space, in a closed trailer, said agent including a tank of such construction that, by means of cheap materials, such as ice and brine under treatment therein, the temperature of the air within the closed vehicle or trailer will quickly become lowered and will be maintained uniformly at the low degree mentioned. The invention includes a vertically disposed, annular container closed at its bottom for holding the ice and brine, the vertical cylindrical channel which opens on the top and bottom of said annular container being provided with a pipe coil in communication with the brine, a pump being provided for moving the brine through the pipe coil and through said annular container, air being forced through the channel for exposure thereof to the pipe coil, and moved from said channel into all parts of the closed vehicle, whereby the meats or other contents will be exposed to a required low temperature for preservation thereof, said moving air being returned to a fan used for this purpose.

In order that the temperature of the air may be under suitable control and that the contents of the vehicle may be effectively maintained at a freezing degree of temperature two pipe coils may be used, and air passageways may be provided in the walls to insure uniform circulation of cold air.

The invention consists of the new and useful construction, combination and arrangement of parts as described herein and claimed, and as shown in the accompanying drawings, it being understood that changes may be made in size, proportion of parts and minor details of construction, said changes being within the scope of the invention as claimed.

In the drawings,

Fig. 1 is a section on line 1—1 of Fig. 2 showing the upright annular tank, the coiled pipe for conducting a liquid refrigerant, a pump and fan with a closed trailer.

Fig. 2 is a view showing the rear end portion of a trailer with the tank and operating parts therein. Fig. 3 is a transverse section on line 3—3 of Fig. 2 showing a pair of pipe coils disposed in the channel of the annular tank. Fig. 4 is a side view, showing a T-pipe coupling.

Fig. 5 is a transverse section on line 5—5 of Fig. 1, showing wall-passageways, and Fig. 6 is a vertical section on line 6—6 of Fig. 1.

Referring now to the drawings for a more particular description, the invention is shown and explained in connection with a closed vehicle or trailer having hollow side walls 7, a floor 8 and a hollow covering or top wall 9, said vehicle or trailer being used for hauling fresh meats or similar products requiring maintainance of a uniform low temperature, the size or style of the truck not being important.

In order that the air in the truck may have a suitable and constant low temperature, the air, after treatment, is forcibly moved and kept in constant circulation.

The vertically disposed tank 10, in order to occupy a limited floor space is supported in an elevated position above the floor and a compartment A is provided beneath said tank for use in mounting a two-way pump 11 and fan 12.

The tank 10 which is of annular form in cross-section, provides a clyindrical, vertical, tubular channel 13 centrally thereof which opens on the top and bottom of the tank.

In Figs. 1 and 3 of the drawings, I have shown an outer pipe coil 14 having a discharge end portion $a$ in communication with the upper end of the tank. Numeral 15 indicates a second pipe coil disposed at the inner side of the coiled pipe 14, and it has a discharge-terminal $b$ in communication with the tank.

While I have shown two coiled pipes 14 and 15 I may, of course, use one or both, depending upon the size or areas of the vehicle body.

The pump 11 and fan 12 are coincidently actuated by a motor 16 and its shaft $c$ a pulley 17 being mounted on the shaft $c$ and engaged by a belt 18. The fan 12 is provided with a shaft 19 provided with a pulley 20 which is also engaged by the belt 18, and therefore the pump and fan will be coincidently actuated by operation of the motor 16.

The pump 11 is in communication with the bottom of the tank by means of a conducting pipe 21. The second conducting pipe of the pump is indicated at 22 which leads to a T-pipe coupling 23 best shown in Fig. 4 of the drawings. This coupling-member 23 is in communication with both pipe coils 14 and 15, a pipe-section $d$ leading from the coupling to the outer pipe coil 14, and a pipe section $e$ leading from the coupling to the pipe coil 15.

As described, actuation of the pump 11 will cause the brine to move from the tank to the pump and will cause the brine to move upwardly from the pump through the pipe coils and discharged to the tank at the top thereof, the brine, of course, moving and circulating in the presence of the ice, and attaining a low degree of temperature.

Numeral 24 indicates a curved pipe-section or elbow which leads from the fan and is in communication with the channel 13 of the tank, the air coming to the fan from the interior of the vehicle body and attaining a freezing temperature while moving upwardly through the channel and exposed to the pipe coils.

The upper end of the tank may remain open at all times if desired, but may be covered by the removable segmental lids 25'.

Numeral 25 indicates a lid which may be removed from the top of the vehicle whenever it is necessary to fill the tank with ice and brine.

In order that the interior of the vehicle body may be maintained at a uniform temperature, and that the contents or load will be uniformly exposed to the cold air, the movements of conditioned air are arranged to be automatically controlled, and moved by action of the fan through sinuous passageways formed in the side walls and top of the vehicle, this method of control being of great advantage in instances of extreme sun-heat. For this control a removable collar or pipe section 26 is used and is removably mounted in the top of the tank in the channel 13.

The top well of the vehicle is provided, longitudinally with a partition 27 which is disposed midway between the sides of the vehicle body, and said top is also provided with additional partitions 28 and 29 at one side of the partition 27, said top being also provided with similar partitions 28' and 29' at the opposite side of the partition 27, all of these partitions being uniformly spaced apart, and thereby providing relatively parallel passageways x and x' for the top of the vehicle body, said partitions being of such proportions that openings a' will be formed at one end of each partition between the outer and inner faces of the hollow wall 9.

The lid 25 is also provided with a central partition 27 and partitions 28 and 28' which register with like partitions of the top when the lid is disposed in its normal position. As shown in Fig. 1, that part of the partition 27 which normally is disposed in the collar or pipe-section 26 is preferably of such proportions that it projects downwardly into the channel 13, and it is obvious that when the cold air is forcibly moved upwardly by action of the fan, approximately one-half of air-movement from the channel 13 would pass into the passageway x and half would pass into the passageway x'.

As shown in Figs. 1 and 6 of the drawings, the side walls 8 of the vehicle body are provided with passageways 30, the partitions 31 between the passageways being of such proportions that openings b' are formed at the ends thereof.

As thus described, the cold air which moves upwardly through the channel 13 and collar 26 will be forcibly moved through the passageways in the top of the vehicle and will enter the passageways 30 in the sides of the vehicle, a pair of openings c' (Fig. 5) being provided in the top of the vehicle which are in communication with a pair of openings d' which are provided for the sides of the vehicle through which the cold air passes and thereafter moves from the sides to the interior through openings e', said last named openings being near the bottom of the vehicle near the fan 12.

In instances when it is not desired to move air through the passageways, the collar 26 may be removed and when removed the cold air will be circulated interiorly of the vehicle.

When replenishing of ice or brine is required for the tank, after the lid 24 has been removed, the segmental covers 25 may be removed, and the use of the collar 26 is not required. It may be removed readily after removal of said lid.

I claim as my invention—

1. In a closed air conditioned vehicle, a vertically disposed ice-and-brine holding tank of annular form in cross section provided with a tubular channel and disposed in the vehicle, a pipe coil disposed in the channel with its upper end in communication with the tank, an actuated two-way pump arranged for conducting brine from the lower part of the tank to the lower part of the pipe coil, and an actuated fan arranged for moving air upwardly through the channel of said tank.

2. An air conditioned vehicle comprising an ice-and-brine holding tank annular in cross-section provided with a tubular channel and disposed in the vehicle, a coiled pipe in the channel of the annular tank in communication with said tank, means including a pump for conducting brine from the tank to the coiled pipe, and means including a pump for conducting brine from the tank to the coiled pipe, and means including a fan for moving air through the channel of said tank.

3. An air conditioned vehicle comprising an upright tank of annular form in cross-section for containing a liquid refrigerant provided with a tubular channel and disposed in the vehicle, a pair of coiled pipes in the channel and in communication with said tank, an actuated pump arranged for conducting the liquid refrigerant from the tank to the coiled pipes in said channel, and an actuated fan for moving air through the channel of said annular tank.

4. In an air conditioned vehicle, a closed vehicle having communicating sinuous passageways in its walls in communication with its interior, an annular ice-and-brine holding tank disposed vertically in the vehicle and having a tubular channel in communication with said sinuous passageways, a spirally shaped pipe in communication with the annular tank and disposed in the channel thereof, an actuated pump having a pipe in communication with the spirally shaped pipe in the channel and having a conducting pipe leading to the tank, and an actuated fan for moving air through the channel of said tank and through the sinuous passageways of the vehicle walls.

5. In an air conditioned vehicle, a closed vehicle having sinuous communicating passageways formed in its side walls and top in communication with its interior, a tank of annular form in cross-section for containing a liquid refrigerant in the vehicle and provided with a tubular channel, a removable pipe section leading from the channel of the annular tank to the passageways of the vehicle, coiled conducting pipes in the channel in communication with the tank, a pump arranged for moving the liquid refrigerant from the tank to the coiled conducting pipes, and an actuated fan arranged for moving air from the vehicle through the channel of the tank, the pipe section and through the passageways of the vehicle.

CHARLES F. MANDERY.